United States Patent Office 3,778,308
Patented Dec. 11, 1973

3,778,308
MAGNETIC STORAGE DEVICE COATING AND PROCESS

Kent G. Roller, George H. Ahlborn, and Richard E. Brown, Boulder, Colo., assignors to Ball Brothers Research Corporation, Boulder, Colo.

No Drawing. Filed Dec. 18, 1970, Ser. No. 99,528
Int. Cl. H01f *10/00*
U.S. Cl. 117—234 6 Claims

ABSTRACT OF THE DISCLOSURE

The magnetic surfaces of magnetic storage devices are protected against abrasion and friction by applying a lubricating coating of a perfluoroalkyl polyether and an optional thin coating of a trifluorochloroethylene copolymer to the surface thereof. The perfluoroalkyl polyethers employed preferably have a molecular weight of at least 1000.

BACKGROUND OF THE INVENTION

This invention relates to coatings for magnetic storage devices and to a process for obtaining the same. More particularly, it is concerned with the application of friction-modifying and abrasion-resistant coatings to the magnetic surfaces of devices that are used to store information by electromagnetic means.

Magnetic recording members such as memory discs and drums as used, for example, in computer devices often spin at a high rate of speed, thus generating aerodynamic films of gas between the magnetic recording element and the read-write head. These films support the head in a non-contacting position a few microinches above the disc. When the disc or drum begins to rotate, as it is stopping, or when it is subjected to a mechanical shock, the aerodynamic film is unable to support the head, thus letting it contact the disc or drum. The great localized processes thus generated often result in damage to the magnetic surface from abrasion, scratching and scoring of the magnetic material. Of course, substantial forces are also involved in operation involving constant contact between the magnetic surface and the head. The use of a coating of a hard, slippery material, such as rhodium, to prevent or reduce mechanical damage to the magnetic film is undesirable since these materials frequently act as catalysts with respect to unsaturated vapors in the near vicinity, resulting in the formation of friction polymers which reduce the effectiveness of access to information stored in the magnetic film.

Similar problems are encountered with magnetic storage devices such as recording tapes and cards, which comprise oxides of iron, cobalt and/or nickel bonded to plastic or metal substrates. The oxide side of the recording tape is in contact with the read-write head. The relative motion between the oxide surface on the tape and the read-write head creates wear because of the abrasive nature of the oxides. Such wear is difficult to avoid. The same type of problem of friction and wear occurs with ovographic image storing devices, which are contacted by various materials during the course of writing and/or erasing images.

These problems are typical of those solved in accordance with the present invention.

Accordingly, one of the objects of the present invention is to provide protective coatings for magnetic storage devices in order to reduce friction, abrasion and scoring and also to reduce friction polymer formation.

Another object of the invention is to provide coatings and a process for applying the same to reduce the friction between the read-write head and the tape or card of a magnetic storage device, while simultaneously extending the useful life of both the tape or card and the read-write head.

A further object of the invention is to provide lubricant coatings for the magnetic surface of the recording members in magnetic storage devices, which extend their life and operating characteristics, including operations carried out at high temperatures or after sterilization cycles.

A still further object of the invention is to protect the image storing surface of ovographic image storing devices by reducing the friction between the image storing surface and the contacting materials.

Yet another object of the invention is to reduce the "weeping coating" effect produced by the action of environmental moisture upon plating salts remaining in the magnetic information storage devices from their processes of manufacture.

These and other objects and advantages of the present invention will become apparent to those skilled in the art from a consideration of the following specification and claims.

SUMMARY OF THE INVENTION

In accordance with the present invention, it has been found that the above objectives as well as other advantages are attained by the application of a perfluoroalkly polyether having high thermal and oxidation stability to memory or information storage and retrieval devices. A precoating or undercoatnig of a copolymer of trifluorochloroethylene may optionally be employed. Devices treated in accordance with the invention include, for example, magnetic memory discs and drums having surfaces of nickel, cobalt and other materials or combinations thereof including those overlaid with protective metals, magnetic tapes and cards having plastic or metal substrates and being provided with the metals or oxides of iron, nickel or cobalt for the memory elements thereof, and ovographic image and/or information storage devices utilizing chalcogenide glasses. Hence, typical objects to be coated in accordance with the invention include magnetic and electromagnetic discs, drums, tapes and cards.

The coating materials found to be especially advantageous, either alone or in combination, in accordance with the objectives of the present invention include the following materials:

(a) Copolymer of trifluorochloroethylene.—A typical example thereof is Exon 461, a trade name product of the Firestone Plastics Company, Pottstown, Pa. This material may be used, when necessary, as a precoating or undercoating to the lubricant coatings described in (b) below and serves to seal in any plating salt residues left on magnetic storage discs and drums as a result of the manufacturing process therefor. This copolymer also serves to seal the magnetic layer of the devices from the effects of atmospheric moisture.

(b) Perfluoroalkyl polyethers.—Exemplary of these materials are: (1) perfluoroethyl polyethers having the following molecular structure:

$$CF_3—(CF_2—CF_2—O)_x—CF_3$$

and (2) perfluoroisopropyl polyethers having the following molecular structure:

$$CF_3-\left(\underset{CF_3}{\underset{|}{C}}F-CF_2-O\right)_x-CF_3$$

wherein $x$ is a positive integer such that the molecular weight of the perfluoroalkyl polyether is at least 1000.

In accordance with the invention, the surfaces of the magnetic devices are coated with thin films of the above materials, which protect the devices and reduce friction between the memory elements and their contacting surfaces. Generally, the process steps used for applying the coatings comprise cleaning the article to be coated, applying the coating by means of dipping, spraying, wiping, brushing, flow coating, etc. and buffing or polishing the coating to the desired thickness, hardness and gloss, when required. Suitable and typical coating thicknesses are about 20 microinches for tapes, about 3–50 microinches for discs and about 3–50 microinches for drums.

Although it is not absolutely required, generally it is necessary to clean the surface to be coated in order to free it of the usual industrial contaminants by rinsing, dipping, wiping or by washing the surface in a commercial solvent such as an organic hydrocarbon or halogenated hydrocarbon, for exampl,e xylene, trifluorotrichloroethane, 1,1,1-trichloroethylene, etc. This step serves to remove dust particles and other contaminants such as oils, silicones, mold release agents or other manufacturing process coatings. When it is necessary to use a protective sealing coating to shield the magnetic surface against atmospheric moisture or contaminants, a copolymer of trifluorochloroethylene is applied to the device by one of the following examplary methods:

(1) Flow coating of the copolymer in a solvent solution.

(2) Spraying of the copolymer in a solvent solution.

(3) Brushing of the copolymer in a solvent solution.

After the application of this copolymer in a solvent solution, when employed, the solvent is removed by allowing the coating to air dry or by subjecting the coating to mild heat. When desired, the lubricant coatings described in the present application can then be applied over the protective coating.

The lubricant coating to be applied to the magnetic element is usually dissolved in a volatile solvent and is applied by spraying dipping, wiping, flow coating or the like. A most efficacious method of application comprises using about 0.5% of coating material dissolved in 99.5% of trifluorotrichloroethane solvent using an air brush spray gun. Of course, other alternative methods may be used to apply the lubricant coatings to the devices. Exemplary alternate coating methods include:

(1) Dipping the device in the lubricant or in a solution of the lubricant in a suitable solvent.

(2) Flow coating the lubricant or a solution of the lubricant in a suitable solvent.

(3) Brushing or wiping the lubricant or a solution of the lubricant in a suitable solvent onto the surface of the device.

The coating thickness desired or required is obtained initially by applying varying ratios of solvent and coating materials sequentially, and determining the thickness of each coating so produced by one or more methods, for example, by weighing, optical measurements, etc. The process of application corresponding to the correct coating thickness is then selected for coating all subsequent devices of a given type.

The solvent may be evaporated under normal conditions, or, optionally, heat may be employed to hasten the evaporation and produce a somewhat tougher coating.

After the volatile solvent has evaporated, leaving a thin mist or coating of the coating material on the substrate, the coating may be buffed with a soft, lint-free cloth or paper. This step serves to remove the liquid droplet or mist portion of the coating, smoothing the coating into a two-dimensional film having properties resembling those of a solid film. It is not usually necessary to buff coatings applied to porous substrates, such as iron oxides in an epoxy or adhesive matrix, since the inherent porosity of the substrate absorbs the bulk of the surface film into the interior of the matrix, thus providing a reservoir of coating material within the substrate matrix.

Large and expensive equipment is not necessary for applying the coatings in accordance with the invention. For example, packaged cleaning solvents and coating materials in portable, pressurized spray containers which produce aerosol mists may be employed. Thus, it is quite easy to clean, apply and recoat the memory devices as desired. If it is necessary to coat large numbers of elements, the process can be automated.

The physical and rheological properties of the coating applied to the devices and the method of application seem to govern the coating thickness. It is important in memory discs and high speed tapes that the final film thickness be kept at less than the maximum allowable head-to-memory device spacing so that the signal strength can be maintained. Thicknesses of less than 10 microinches are adequate with coatings of trifluorochloroethylene copolymers and the perfluoroalkyl polyethers.

Hence, in accordance with this invention, coatings are provided for magnetic storage devices which act as a protective lubricant, modifying any adverse frictional effects and providing an abrasion-resistant property. These coatings are suitable with various memory and information storage and retrieval devices containing various magnetic materials, for example, thin layers of magnetic elements and alloys formed either as continuous films or as dispersions of particles in binders. Representative magnetic materials have been discussed above and include, for example, cobalt, nickel and iron alloys or compounds such as ferrites, antimonides, arsenides, sulfides, oxides or other similar compositions that are known to have useful magnetic properties, in addition to the materials enumerated hereinabove. The advantages of the invention are especially pronounced with rhodium metal-plated memory devices in that the chemically active rhodium is shielded by the sealing feature of the coating.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A magnetic recording member comprising a substrate of a magnetic material and a thin outer coating of a friction - modifying, abrasion - resistant perfluoroalkyl polyether having a thickness between about 3 microinches and 50 microinches and having a molecular weight of at least 1000 on said surface.

2. A magnetic recording member in accordance with claim 1, wherein a trifluorochloroethylene copolymer coating is interposed between said substrate and said polyether coating.

3. A magnetic recording member in accordance with claim 2, wherein said perfluoroalkyl polyether is a perfluoroethyl polyether.

4. A magnetic recording member in accordance with claim 2, wherein said perfluoroalkyl polyether is a perfluoroisopropyl polyether.

5. A magnetic recording member in accordance with claim 1, wherein said magnetic material comprises at least one substance selected from the group consisting of nickel, cobalt, iron and the oxides thereof.

6. A magnetic recording member in accordance with claim 1, wherein a layer of rhodium metal is interposed between the magnetic surface and the thin coating is adhered to the rhodium layer.

References Cited

UNITED STATES PATENTS

| | | | | |
|---|---|---|---|---|
| 3,466,156 | 9/1969 | Peters et al. | 117—75 | X |
| 3,274,239 | 9/1966 | Selman | 260—614 | X |
| 3,272,871 | 9/1966 | Warnell | 252—54 | X |
| 3,551,202 | 12/1970 | Wright et al. | 117—239 | |
| 3,516,860 | 6/1970 | Simmons | 117—239 | X |
| 3,476,595 | 11/1969 | Nacci | 117—237 | X |
| 3,490,946 | 1/1970 | Wolff | 117—239 | X |
| 3,205,121 | 9/1965 | Eichler et al. | 117—239 | X |
| 3,202,529 | 8/1965 | Dunlap et al. | 117—240 | X |

WILLIAM D. MARTIN, Primary Examiner

B. D. PIANALT, Assistant Examiner

U.S. Cl. X.R.

117—236, 237, 239, 240